(12) United States Patent
Carreras et al.

(10) Patent No.: US 6,533,426 B2
(45) Date of Patent: Mar. 18, 2003

(54) METHOD OF CENTRIFUGALLY CASTING A PARABOLIC MEMBRANE MIRROR HAVING A SHAPE-RESTORATIVE FORCE

(75) Inventors: Richard A. Carreras, Albuquerque, NM (US); Dan K. Marker, Albuquerque, NM (US); James M. Wilkes, Sandia Park, NM (US); Dennis Duneman, Albuquerque, NM (US); James R. Rotge, Albuquerque, NM (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 09/681,581

(22) Filed: May 2, 2001

(65) Prior Publication Data

US 2002/0163744 A1 Nov. 7, 2002

(51) Int. Cl.[7] .................. G02B 5/10; B29D 11/00; B29C 39/08
(52) U.S. Cl. ............. 359/847; 359/846; 359/900; 264/1.9; 264/2.1; 264/298; 264/311
(58) Field of Search .............. 264/1.9, 2.1, 298, 264/299, 310, 311; 359/883, 847, 846, 838, 582, 584, 585, 900

(56) References Cited

U.S. PATENT DOCUMENTS

| | | | | |
|---|---|---|---|---|
| 669,119 A | * | 3/1901 | Krank | |
| 3,010,153 A | * | 11/1961 | Bittner | 164/114 |
| 3,274,301 A | * | 9/1966 | Kulp, Jr. | 264/2.1 |
| 3,577,323 A | * | 5/1971 | Pichel | 204/281 |
| 3,691,263 A | * | 9/1972 | Stoy et al. | 264/2.1 |
| 5,583,704 A | * | 12/1996 | Fujii | 359/584 |
| 6,254,243 B1 | * | 7/2001 | Scrivens | 359/883 |
| 2001/0030820 A1 | * | 10/2001 | Scrivens | 359/883 |

FOREIGN PATENT DOCUMENTS

| | | | | |
|---|---|---|---|---|
| DE | 3007350 A | * | 9/1981 | |
| FR | 2121434 | * | 8/1972 | |
| FR | 2506751 | * | 12/1982 | |
| JP | 61-186230 A | * | 8/1986 | |

OTHER PUBLICATIONS

Robert L. Richardson, et al., "Generation of front-surface low-mass epoxy-composite mirrors by spin-casting", Optical Engineering, vol. 40, No. 2, pp. 252–258. Feb. 2001.*

* cited by examiner

*Primary Examiner*—John Juba, Jr.
(74) *Attorney, Agent, or Firm*—James M. Skorich; Kenneth E. Callahan

(57) ABSTRACT

A method for fabricating an optical quality, free-standing, compliant parabolic membrane mirror using an inverted parabolic mandrel created by rotating a liquid confined to a cylindrical polymer and applying a reflective optical stress coating once the substrate has hardened. The stress coating applies a tensile force to the substrate that offsets the stress in the substrate that would otherwise decrease the convexity, and also generates a force to restore the membrane mirror to its original convex parabolic shape when the mirror is deformed by an external force.

4 Claims, 2 Drawing Sheets

METHOD OF CENTRIFUGALLY CASTING A PARABOLIC MEMBRANE MIRROR HAVING A SHAPE-RESTORATIVE FORCE

FEDERAL RESEARCH STATEMENT

The conditions under which this invention was made are such as to entitle the Government of the United States under paragraph I(a) of Executive Order 10096, as represented by the Secretary of the Air Force, to the entire right, title and interest therein, including foreign rights.

BACKGROUND OF INVENTION

This invention is in the field of very large optical apertures, and in particular in the use of shape-retaining thin film membrane mirrors of optical quality.

Various focusing mirror systems fabricated from a reflective metallized membrane are known in the prior art. Commonly, a differential pressure is established between an enclosed area behind the reflective surface and the ambient pressure to control the contour of the flexible reflective surface. The curvature is controlled by various means, such as: an electropneumatic control system (U.S. Pat. No. 4,179,193); an actuator pushing or pulling on a rear membrane (U.S. Pat. No. 5,016,998): an actuator in physical contact with the rear surface of the membrane (U.S. Pat. No. 4,422,723); a double membrane with a partial vacuum between with a complex edge tensioning system to vary the curvature (U.S. Pat. Nos. 5,680,262 and 5,552,006); and a curvature determined by uniform differential pressure applied to a membrane with a non-uniform radial distribution of thickness or a uniform membrane loaded with a non-uniform differential pressure obtained by localized electrostatic or magnetic pressure (U.S. Pat. No. 4,046,462).

Most of the aforementioned inventions are designed for solar energy concentrators. The surfaces obtained do not approach the optical quality required of an astronomical telescope. The next step toward imaging quality are telescopes having less than ~200 waves of low-spatial-frequency surface error. Telescopes having this level of surface error can be compensated with real time monochromatic holography, requiring spatial light modulator resolutions of no more than 40 lines per mm. This situation should produce a near-diffraction limited image. Very large optical apertures, particularly for space-based systems, could benefit from lightweight, optical quality membrane mirrors. Potential applications include astronomy, imaging and surveillance, and laser beam projection.

Optical quality membrane mirrors have been demonstrated (U.S. Pat. No. 6,113,242) wherein a film is mounted on an optically flat circular ring and stretched over a smaller optically flat circular ring. Pressure or vacuum is separately applied to both the inner disk and the outer annulus to produce a doubly-curved optical quality surface in the inner disk. In the atmosphere, pulling a partial vacuum on the underside of the membrane mirror creates a pressure differential. For use in space, a pressure chamber that is bounded by the mirrored surface and a clear polyimide sheet creates the curvature of the optic. The combination of these two sheets is referred to as a lenticular. The use of a clear sheet or inflatable canopy to maintain the necessary pressure to deform the membrane in space entails several problems. Large strains are required, which can put undue structural requirements on the supporting structure. In addition, the canopy itself can refract the incoming radiation or otherwise interfere with various potential missions, such as laser beam propagation.

It is an object of the present invention to provide an optical quality parabolic membrane mirror for use in space that can be collapsed for launch and resume its shape when deployed in space.

SUMMARY OF INVENTION

A very large aperture optical membrane mirror for use in space is disclosed along with its method of fabrication. The membrane substrate material is first cast on a spinning, inverted (i.e. concave) mandrel that has the basic desired shaped (i.e., parabolic). Stress-inducing and optically reflective coatings are applied after the substrate has cured. This insures that the membrane mirror keeps its shape after it is detached from the mandrel, and provides a highly reflective surface for the operating wavelength band. A rim structure can be attached to the membrane while still in the mandrel for attachment to other structures.

BRIEF DESCRIPTION OF DRAWINGS

The various features of novelty that characterize the invention are specifically pointed out in the claims annexed to and forming a part of this disclosure. For a better understanding of the invention, its operating advantages, and specific objects attained by its uses, reference is made to the accompanying drawings and descriptive matter in which a preferred embodiment of the invention is illustrated.

DETAILED DESCRIPTION

A large aperture membrane mirror for space-based optical applications is disclosed along with a method for fabricating it. Basically, the membrane mirror substrate material is cast on a spinning, inverted mandrel to impart the basic parabolic shape desired. Optically reflective and stress-inducing coatings are then applied to insure the membrane mirror is highly reflective and returns to the desired shape after deployment.

When a liquid contained in a cylindrical enclosure is rotated about the cylindrical axis, the liquid surface takes the shape of a parabola. The idea of using this effect with mercury to create a large reflective surface originated at the University of Laval. This effect has also been used, for example, at the University of Arizona to create a large glass telescope mirror blank by allowing molten glass to slowly cool while rotating.

Figure 1:
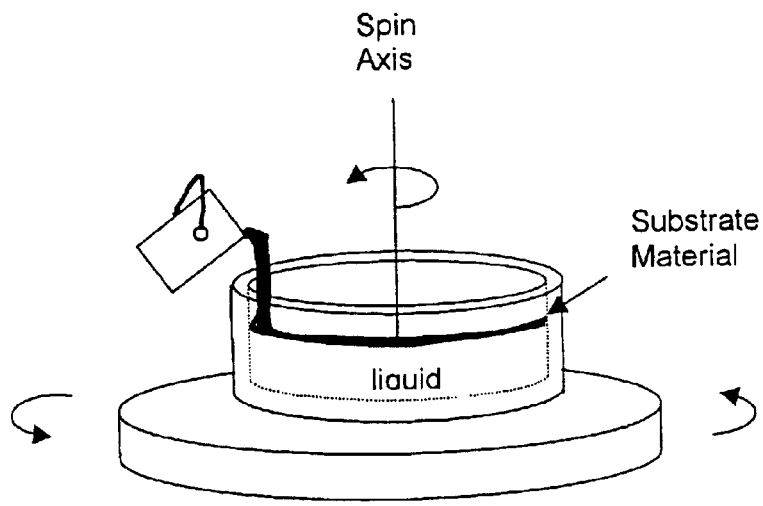
FIG. 1 illustrates the spinning inverted mandrel method with the fast curing substrate material being added.

In the present invention, the rotating liquid is used as an inverted mandrel into which is poured a hard curing liquid to form the membrane mirror substrate (FIG. 1). For example, water might be used in the spinning container and a fast curing liquid polymer used as the membrane mirror substrate e.g., CP1, which is the trademark describing a clear, solvent-based evaporative-curing polyimide produced by SRS Technologies, Inc, of Huntsville, Ala. This method has several advantages over a regular mandrel method. The irregularities of the mandrel will not be impressed upon the surface of the reflective (top) side of the membrane. In addition, this method is affordable and scalable to very large diameters of the membrane mirror.

Simply creating a large parabolic-shaped film is not sufficient, however.

Figure 2:
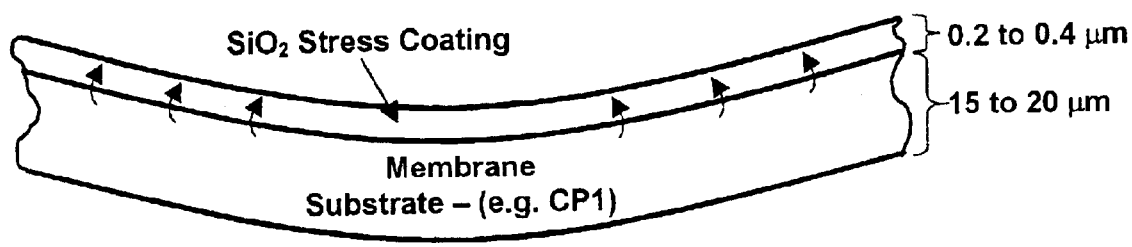
FIG. 2 shows a cross-section of the substrate membrane and stress coating.

Boundary control and in-plane stresses are needed to uniquely determine the shape of the membrane mirror. A certain amount of in-plane strain is required for an optical membrane to perform optimally. Additionally, a global stress state must be imposed, allowing small movements of the inner and outer boundary to influence the overall shape of the mirror. Hence the substrate membrane must be strained into its final configuration. A variety of technologies and techniques afford an opportunity to stress the membrane. Examples are inflation, boundary manipulation, shape memory alloys, electrostatic control, piezoelectric or bi-morph material, hydrostatic forces, rotational forces, stress coatings and others. In the present invention, optical stress coatings are applied to exert the necessary in-plane stress to the membrane. This gives the membrane a unique deterministic shape while maintaining the flexibility to be packaged for transport into orbit and to return to its desired shape once unpacked. The negative effects of optical coating stress are well-understood, and have been studied and documented for years by optical coatings experts. Now this knowledge will be applied to finalizing the figure of a near-optimal-shape film Once the membrane substrate material has hardened, a reflective optical stress coating is applied to the substrate material, prior to removing the membrane substrate from the inverted mandrel, to stiffen the membrane (FIG. 2). The thickness of the membrane substrate is on the order of a few tens of micrometers, e.g., from 15 to 20 $\mu$m. and provides insufficient stiffness to maintain the desired parabolic shape upon removal from the mandrel. A variety of stress coatings can be applied, e.g., $SiO_2$ or Zirconia/Silica. In addition, these stress coatings can be applied several times to increase the thickness as necessary to maintain the desired shape, e.g., from 0.2 to 0.4 $\mu$m.

Figure 3:
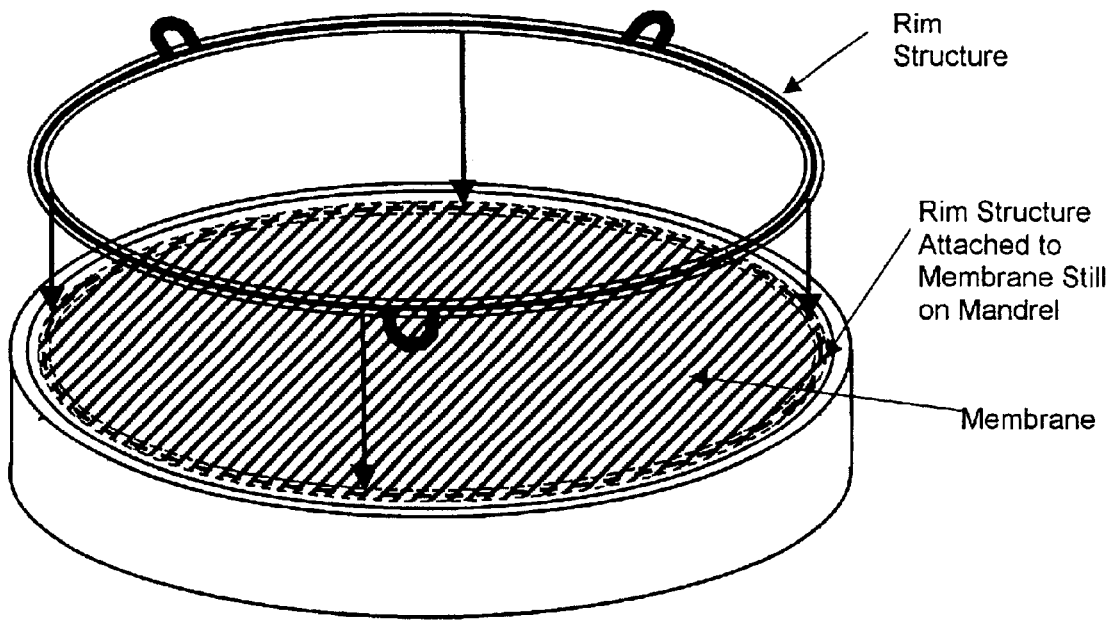
FIG. 3 illustrates the ring structure being attached to the membrane in the mandrel.
Figure 4:
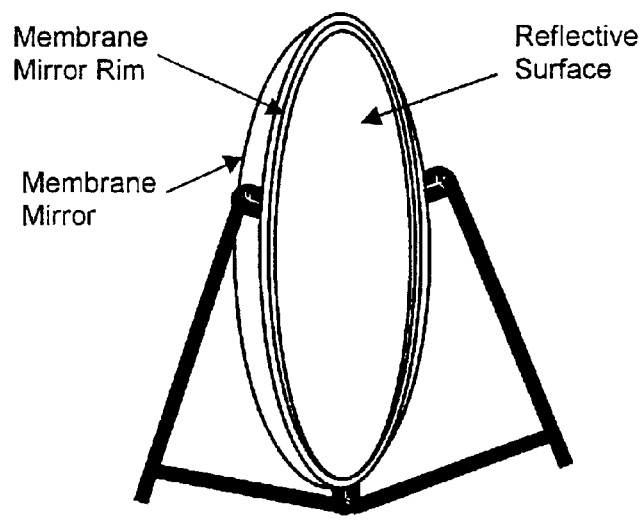
FIG. 4 shows the free-standing parabolic membrane mirror held by the ring structure.

A ring structure can then be attached to the outer rim of the membrane mirror and the membrane mirror removed from the mandrel (FIG. 3). In this way one obtains a free-standing, compliant parabolic membrane mirror (FIG. 4).

While a diffraction-limited optical surface can only be approached with this membrane mirror, very good optical tolerances can be produced. Adaptive optics image correction techniques can be used on large space telescopes to compensate for any slight irregularities.

What is claimed is:

1. A method of fabricating a flexible parabolic membrane mirror comprising the steps of:

rotating a cylindrical container containing a first fluid, about a longitudinal axis of symmetry to form a mandrel having a parabolic shape;

introducing a fast-curing liquid polymer into the rotating container and allowing the polymer to cure, to form a substrate;

depositing a reflective elastic stress coating in compression onto the substrate, and allowing the coating to cure, with both the depositing and the curing of the coating occurring while the container is rotating; and removing an assembly comprised of the substrate and the coating, from the container.

2. The method of fabricating a flexible parabolic mirror as recited in claim 1, wherein the depositing step includes depositing a coating thickness of 0.2 to 0.4 micrometers.

3. The method of fabricating a flexible parabolic mirror as recited in claim 2, wherein the introducing step includes introducing a quantity of the liquid polymer sufficient to form a substrate thickness of 15 to 20 micrometers.

4. The method of fabricating a flexible parabolic mirror as recited in claim 2, wherein the stress coating is selected from the group consisting of $SiO_2$ and $ZrO_2$.

* * * * *